United States Patent [19]

Inoue et al.

[11] Patent Number: 4,636,307
[45] Date of Patent: Jan. 13, 1987

[54] HOLLOW-FIBER FILTERING MODULE AND WATER PURIFICATION DEVICE UTILIZING IT

[75] Inventors: Michio Inoue, Kasugai; Kazuto Kawashima, Nagoya, both of Japan

[73] Assignee: Mitsubishi Rayon Co., Ltd., Tokyo, Japan

[21] Appl. No.: 650,540

[22] Filed: Sep. 14, 1984

[30] Foreign Application Priority Data

Sep. 16, 1983 [JP] Japan .............................. 58-143520[U]
Jul. 17, 1984 [JP] Japan .............................. 59-107172[U]

[51] Int. Cl.⁴ ...................... B01D 19/00; B01D 13/01
[52] U.S. Cl. .................................. 210/188; 210/262; 210/266; 210/295; 210/433.2; 210/436; 55/159
[58] Field of Search ............ 210/436, 472, 257.2, 210/261, 262, 266, 295, 321.1, 323.2, 433.2, 188, 416.3, 258; 55/159

[56] References Cited

U.S. PATENT DOCUMENTS

| | | | |
|---|---|---|---|
| 2,670,081 | 2/1954 | Quinn | 210/416.3 |
| 3,520,416 | 7/1970 | Keedwell | 210/508 |
| 3,523,408 | 8/1970 | Rosenberg | 55/159 |
| 3,542,199 | 11/1970 | Bray et al. | 210/257.2 |
| 3,993,816 | 11/1976 | Baudet et al. | 210/323.1 |
| 4,054,526 | 10/1977 | Muller | 210/416.3 |
| 4,160,727 | 7/1979 | Harris, Jr. | 210/248 |
| 4,212,744 | 7/1980 | Oota | 210/323.2 |
| 4,319,996 | 3/1982 | Vincent et al. | 210/436 |
| 4,515,606 | 5/1985 | de Winter | 55/159 |
| 4,528,093 | 7/1985 | Winer | 210/416.3 |
| 4,531,954 | 7/1985 | Klein | 55/159 |

FOREIGN PATENT DOCUMENTS

| | | |
|---|---|---|
| 0061328 | 9/1982 | European Pat. Off. . |
| 3043073 | 9/1982 | Fed. Rep. of Germany . |
| 5639184 | 8/1979 | Japan . |
| 2134812 | 8/1984 | United Kingdom . |

OTHER PUBLICATIONS

"Pocket Purifier" Pamphlet—undated.

Primary Examiner—S. Leon Bashore
Assistant Examiner—K. M. Hastings
Attorney, Agent, or Firm—Oblon, Fisher, Spivak, McClelland, & Maier

[57] ABSTRACT

A hollow-fiber filtering module includes a casing having an open end and an inlet for introducing water to be treated thereinto. A bundle of hollow fibers is mounted within the casing, each of the hollow fibers having an open end. A fastening member sealingly joins the open ends of the hollow fibers to the open end of the casing in sealing relation thereto, the open ends of the hollow fibers opening to the exterior of the casing. Part of the hollow fibers are made of a microporous membrane having a portion of a hydrophobic nature, and the other hollow fibers are hydrophilic microporous membranes. Gas introduced into the filtering module can easily permeate the hydrophobic portions of the hollow fibers and is discharged through the bores of the hollow fibers from their open ends together with the filtered water. There is also disclosed a water purification device employing such a hollow-fiber filtering module.

5 Claims, 11 Drawing Figures

HOLLOW-FIBER FILTERING MODULE AND WATER PURIFICATION DEVICE UTILIZING IT

BACKGROUND OF THE INVENTION

1. Field of the Invention

This invention relates to a filtering module comprising a bundle of microporous hollow fibers and a water purification device utilizing such a filtering module.

2. Prior Art

In recent years, city water has been much deteriorated. For example, such city water contains organic substances such as phthalic ester and also contains excessive alkali earth metal ions or the like. This is quite undesirable from the viewpoint of health and adversely affects the taste of the water. Also, it is important to secure drinking water in developing countries and disaster-striken areas. The drinking water in such countries and areas may contain infectious bacilli such as dysentery bacilli, cholera bacilli and typhoid bacilli as well as colon bacilli. Therefore, it has been desired to remove organic substances, taste-affecting substances and the various bacilli or bacteria from the drinking water.

There is known one conventional water purification or treatment device which utilizes activated carbon and is adapted to be connected to a faucet of city water to remove impurities and objectionable odor-developing substances from the water by adsorption. Another conventional water purification device utilizes an ion exchange resin column for softening hard water. A further conventional water purification device utilizes a reverse osmosis method. In the case of the water purification device utilizing activated carbon, the activated carbon absorbs chlorine serving as a sterilizing component in city water, and the water in the purification device loses its sterilizing effect. As a result, bacilli or bacteria tend to propagate in the water purification device so that they are introduced into the water passing through the water purification device.

The ion exchange resin is only effective in removing ions in the water and can not remove bacilli and non-ionic impurities, and there is also the risk that bacilli or bacteria propagate in the water purification device.

The water purification device of the activated carbon type and the ion exchange resin column both require a pump or the like in order to purify the water. Therefore, the purified water can not easily be obtained at any place with these devices. Also, the reverse osmosis method requires a rather bulky equipment and a high pressure-generating means. Thus, the purified water can not also be easily obtained with this method.

There has also been proposed a handy or portable water purification device designed to treat water in a lake, a swamp, a pond or a river to obtain a drinking water in an emergency such as an earthquake and other disasters. In such a handy water purification device, water to be treated is first filtered by a filter of a relatively large pore size, and the filtered water is treated by activated carbon. Then the water is sterilized by sodium hypochloride or the like. However, the resultant water has the odor of the sterilizing agent and contains the organic substances passed through the filter. Therefore, the treated water is quite unsavory.

A further conventional water purification device comprises a tube containing activated carbon and having a membrane secured to one end thereof for preventing the passage of bacilli, and a hand-operated pump of the syringe type to cause water being purified to pass through the flat membrane. However, with such a hand-operated pump, the rate of permeation of the water through the membrane is not satisfactory. In addition, When air is introduced into the water to be purified, the permeation rate further becomes low.

In order to overcome the deficiencies of the above water purification devices, there has been proposed a water purification device which comprises a hollow fiber-filtering module, and activated carbon unit and an ion exchange resin unit. The conventional filtering module of the type which filters the whole of liquid introduced thereinto comprises a bundle of hollow fibers made of a hydrophilic membrane. When the liquid containing gas such as air is introduced into the filtering module through an inlet port thereof, the gas can not permeate the hollow fiber at a pressure, for example, of 1 kg/cm$^2$ so that such entrapped gas will be disposed in contact with the outer surfaces of the hollow fibers. As a result, such entrapped gas will prevent the water from permeate the hollow fibers, so that the overall permeability of the hollow fiber bundle becomes lower.

In the case of the conventional filtering module of the type designed to filter part of the liquid introduced thereinto, the gas entrapped in the filtering module may be discharged therefrom together with those of the liquid which has not been filtered. In this case, there is the disadvantage that a relatively large amount of water must be treated to obtain some amount of purified water. In the case of the filtering module designed to filter the whole liquid, the entrapped gas can not be discharged from the filtering module, and therefore if a large amount of gas is entrapped in the filtering module, the liquid can hardly permeate the hollow fibers.

In order to overcome this difficulty, it has been proposed to degas the liquid before it is introduced into the hollow-fiber filtering module. However, this method requires a tank of a relatively large size and a vacuum pump and hence is rather expensive. Another alternative is to flow the liquid downwardly through the filtering module so that the gas contained in the liquid will collect in the upper portion of the filtering module. This method is not entirely satisfactory, however, in that when a large amount of gas is introduced into the filtering module, the filtering efficiency of the hollow fibers is still adversely affected. A further proposal is to provide a gas reservoir with a vent cock adjacent to an upper inlet port of the filtering module so that the gas entrapped in the gas reservoir can be discharged by manipulating the vent cock. With this method, if the gas reservoir of a large size is provided, the overall size of the filtering module is increased, and a dead space is also increased. On the other hand, if the gas reservoir is kept to a small size, the vent cock must be frequently manipulated. Also, care must be always taken of the amount of water to be filtered so that gas is not inadvertently introduced into the filtering module.

SUMMARY OF THE INVENTION

With the above deficiencies in view, it is therefore an object of this invention to provide a hollow-fiber filtering module capable of easily discharging entrapped gas.

Another object is to provide a water purification device incorporating such a hollow-fiber filtering module.

According to a first aspect of the present invention, there is provided a hollow-fiber filtering module which comprises a casing having an open end; a bundle of hollow fibers mounted within the casing, each of the hollow fibers having an open end, part of the hollow fibers being made of a microporous membrane having a portion of a hydrophobic nature, the other hollow fibers being hydrophilic microporous membranes; and a fastening member sealingly joining the open ends of the hollow fibers together and fastening the open ends of the hollow fibers to the open end of the casing in sealing relation thereto, the open ends of the hollow fibers opening to the exterior of the casing.

According to another aspect of the present invention, there are provided several types of water purification units or devices incorporating the hollow-fiber filtering module of the above type. The microporous membrane having the hydrophobic portion can be made of polyolefin, a fluorocarbon resin, polyester, EVA, polyamide or the like. The hydrophilic microporous membrane can be made of cellulose, PVA, the above-mentioned hydrophobic membrane which is temporarily hydrophilized by alcohol or a surface-active agent, or the above-mentioned hydrophobic membrane which is permanently or semi-permanently hydrophilized by one of a monomer and a polymer grafted on its surface or a hydrophilic polymer coated on the surface of the micropores of the membrane. It is preferred that the microporous membrane should prevent the passage of pyrogen or endotoxin therethrough. When the microporous membrane is made of polyolefin, it can prevent undesirable organic substances such as phthalic ester. The pore size, porosity and thickness of the microporous membrane are determined in accordance with a liquid to be filtered. Particularly, it is preferred that the microporous membrane should have a permeability of not less than $1 /m^2$ min. under a water pressure of $1 kg/cm^2$.

For forming the bundle of hollow fibers, the hollow fibers of the microporous membrane having a hydrophobic portion and the hollow fibers of the hydrophilic microporous membrane are merely formed into a bundle. Alternatively, hollow fibers of a hydrophobic membrane are first hydrophilized and formed into a bundle which in turn is housed, for example, in a tubular shell to provide a filtering module. Then, part of the hollow fibers of the bundle are returned to a hydrophobic nature. Since the hollow fibers constituting the bundle have the hydrophobic portions, any gas introduced into the filtering module can pass through the hydrophobic portions of the membranes so that the gas will not collect on the outer surfaces of the hollow fibers, thereby ensuring a good filtering efficiency of the filtering module. The hydrophobic portions may be distributed uniformly over the bundle of hollow fibers. Alternatively, the hydrophobic portions may be so distributed as to form stripes and the like. It is preferred that part of the outer peripheral hollow fibers of the bundle should have the hydrophobic portions. The reason for this is that the density of the hollow fiber bundle usually becomes higher toward the center of the bundle so that the introduced gas tends to collect in a space defined by the inner peripheral surface of the tubular shell and the periphery of the hollow fiber bundle. Therefore, when the hollow fibers having the hydrophobic portions are disposed at the periphery of the bundle, the gas introduced into the filtering module can be discharged therefrom more easily. The hydrophobic portion may be formed at any portion of the hollow fiber, but preferably the hydrophobic portions are formed at upper portions of the hollow fibers near an outlet of the filtering module because gas is lower in specific gravity than liquid. Therefore, in the case where the hydrophobic hollow fibers once hydrophilized are returned to a hydrophobic nature, preferably each of these hollow fibers is rendered hydrophobic at and near the fastening member securing the open ends of the hollow fibers to the open end of the tubular shell.

For example, for imparting a hydrophobic nature to a portion of the hollow fiber as described above, the filtering module, containing the bundle of hollow fibers made of a hydrophobic microporous membrane which has been temporarily hydrophilized, is placed with the fastening member being directed downwardly, so that water is discharged from the filtering module under the influence of gravity. Then, the filtering module is placed with the fastening member being directed upwardly, and for example, alcohol is applied to the microporous hollow fibers in such an amount that they get wet sufficiently. Then, compressed air of $1 kg/cm^2$ is applied to the hollow fibers from their upper open ends, so that the alcohol penetrates the membranes constituting the hollow fibers and is mixed with the water in the membranes, and this mixture passes through the membranes so that air is instead introduced into the membranes to dry them, thereby imparting a hydrophobic nature to the membranes. The hollow fibers are rendered hydrophobic at those portions through which the alcohol can most easily pass through, that is to say, the portions adjacent to the fastening member. At the same time, the open end portions of the hollow fibers joined together by the fastening member are also rendered hydrophobic. The ratio of the overall hydrophobic portions to the total membrane area of the hollow fiber bundle is adjusted by the time of application of the compressed air.

In order that part of the outer peripheral hollow fibers of the bundle can have the hydrophobic portions, a bundle of hollow fibers made of a hydrophilic microporous membrane is first formed, and hollow fibers of a hydrophobic microporous membrane are arranged around this bundle. Alternatively, the hollow fibers are held relatively densely at the time when the hollow fibers are rendered hydrophobic in the above-mentioned manner, but alcohol is applied only to the hollow fibers at the outer peripheral portion of the bundle, so that only the peripheral hollow fibers are made hydrophobic.

The ratio of the overall hydrophobic portions to the total membrane area of the hollow fiber bundle is determined in accordance with the viscosity of the liquid to be treated and the amount of gas contained in this liquid, but it is preferred that this ratio should be 0.2 to 10%. Even if this ratio is more than 10%, the degassing of the filtering module is not so improved, and in contrast the filtering efficiency is affected since the hydrophilic portions of the bundle are reduced. If the ratio is less than 0.2%, the degassing can not be achieved satisfactorily.

DESCRIPTION OF THE PREFERRED EMBODIMENTS OF THE INVENTION

Figure 1:
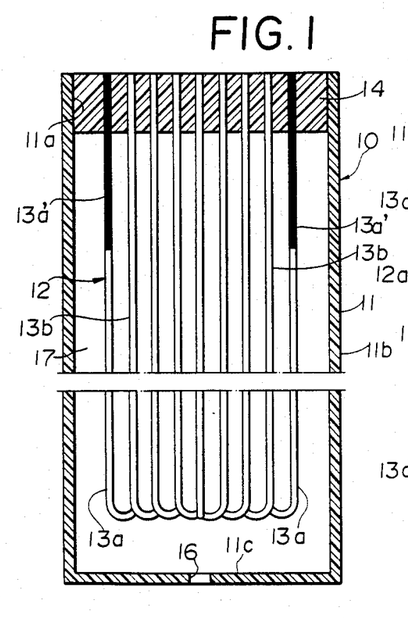
FIG. 1 is a cross-sectional view of a hollow-fiber filtering module provided in accordance with the present invention.
Figure 2:
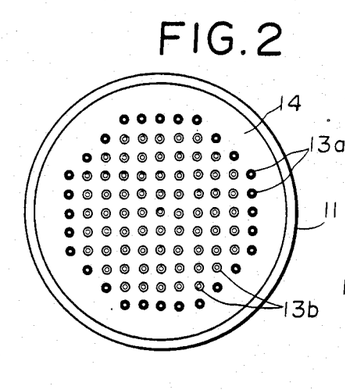
FIG. 2 is a plan view of the filtering module.

A hollow-fiber filtering module 10 shown in FIGS. 1 and 2 comprises a casing or tubular shell 11 of a circular cross-section having an open end 11a, a bundle 12 of U-shaped hollow fibers 13 accommodated within the tubular shell 11, and a fastening member 14 securing the ends of the hollow fibers 13 to the open end 11a of the tubular shell 11. Each of the U-shaped hollow fibers 13 has opposite open ends. The fastening member 14 is in the form of a potting resin, such as a urethane resin, which sealingly joins the open ends of the hollow fibers 13 together, the open ends of the hollow fibers 13 opening to the exterior of the tubular shell 11. The hollow fiber bundle 12 of a generally circular cross-section is disposed generally coaxially with the tubular shell 11 and is spaced from a peripheral wall 11b of the tubular shell 11. The lower end of the bundle 12 is spaced from a bottom wall 11c of the tubular shell 11.

Most of the outer peripheral hollow fibers 13a of the bundle 12 are made of a microporous membrane having a portion 13a' of a hydrophobic nature, the hydrophobic portion 13a' being indicated in black for illustration purposes. The other hollow fibers 13b are made of a hydrophilic microporous membrane. In this embodiment, the hydrophobic portion 13a' of each hollow fiber 13a extends from the outwardly-disposed open end and terminates far short of the lower bent portion of the hollow fiber 13a. The hydrophobic portion 13a' may extend along the entire length of each hollow fiber 13a.

When water to be treated is introduced into the tubular shell 11 through a port 16 in the bottom wall 11c and is caused to flow upwardly toward the fastening member 14, gas contained in the water flows upwardly through an annular space 17 defined by the hollow fiber bundle 12 and the peripheral wall 11b since the bundle 12 of hollow fibers is dense. During the upward movement of the gas, the gas permeates the hydrophobic portions 13a' of the membranes of the outer peripheral hollow fibers 13a and is discharged from their open ends through their bores. The gas which has come upwardly to the fastening member 14 also permeates the hydrophobic portions 13a' of the hollow fibers 13a adjacent to the fastening member 14.

Alternatively, if the water is caused to flow downwardly through the tubular shell 11, the gas introduced into the shell 11 can permeate the hydrophobic portions 13a' of the hollow fibers 13a and is discharged from the filtering module. Therefore, a reduction in the filtering efficiency of the filtering module 10 can be kept to a minimum. Also, when the filtering module 10 is disposed horizontally in use, the gas, introduced into the tubular shell 11 together with the water to be treated, permeates the hydrophobic portions 13a' of those of the outer peripheral hollow fibers 13a disposed at an upper portion of the horizontally-disposed filtering module 10. Therefore, the filtering efficiency of the filtering module 10 is not lowered.

Figure 3:
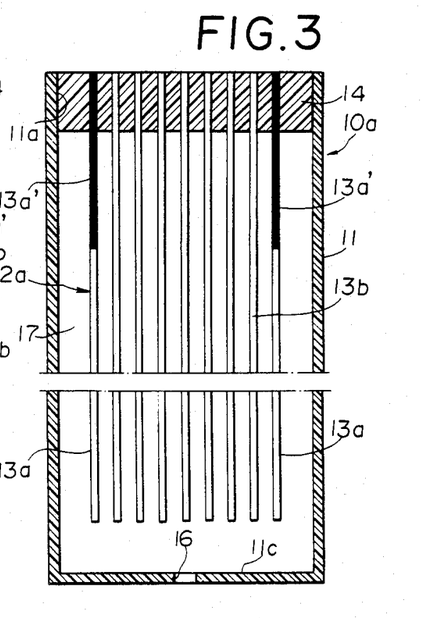
FIG. 3 is a view similar to FIG. 1 but showing a modified filtering module.
Figure 4:
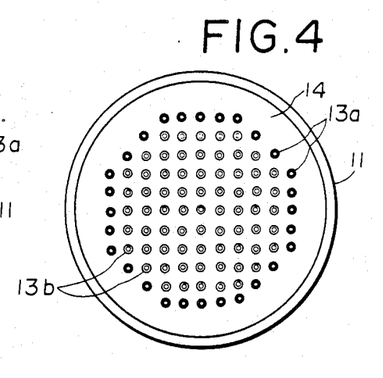
FIG. 4 is a plan view of the filtering module of FIG. 3.

FIGS. 3 and 4 show a modified filtering module 10a which differs from the filtering module 10 of FIG. 1 in that a bundle 12a of straight hollow fibers 13 replaces the bundle 12 of U-shaped hollow fibers 13. Each of the straight hollow fibers 13 has an open end which is fixed to the open end 11a of the tubular shell 11 by the fastening member 14 as described above for the filtering module 10. The other end of each straight hollow fiber 13 is closed. Also, as is the case with the filtering module 10, most of the outer peripheral hollow fibers 13a are made of a microporous membrane having a hydrophobic portion 13a', and the other hollow fibers 13a are hydrophilic microporous membranes. The hydrophobic portion 13a' of the hollow fiber 13a extends from its open end and terminates well short of its central point. The hydrophobic portion 13a' may extend along the entire length of each hollow fiber 13a.

The filtering modules 10 and 10a are of the type which filter the whole of the water introduced into the tubular shell 11. Since gas or air introduced into the tubular shell 11 can be easily discharged from the filtering module through the hydrophobic portion 13a' of the hollow fibers 13a, the filtering efficiency of the filtering module is not lowered. Also, there is no need to degas the water to be treated before it is introduced into the tubular shell 11.

Figure 5:
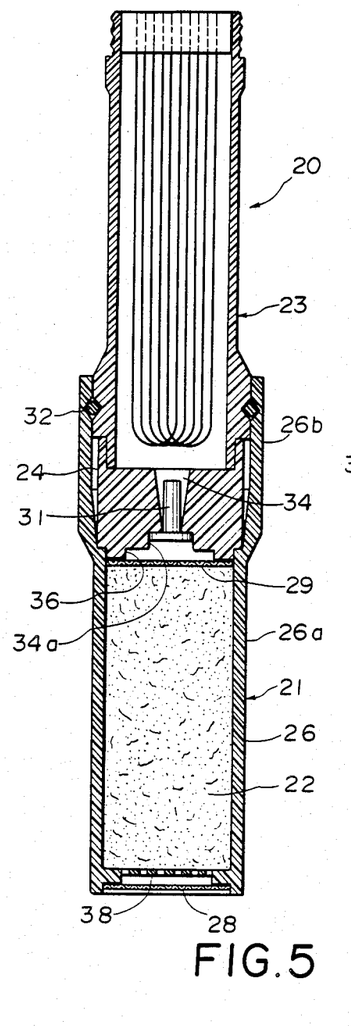
FIG. 5 is a cross-sectional view of a water purification unit.

FIG. 5 shows a water purification unit 20 which comprises a cartridge including an absorbent module 21 containing an absorbent 22, a hollow-fiber filtering module 23 similar to the filtering module 10 of FIG. 1, and a connective member 24. The absorbent module 21, the filtering module 23 and the connective member 24 may be provided as a unitary construction. However, the service life of the absorbent 22 such as activated carbon and an ion exchange resin is usually shorter than that of the hollow fibers of the filtering module 23, and therefore it is preferred that the above three members 21, 23 and 24 should be separate so that when they become old or ineffective, they can be replaced by new ones.

The absorbent module 21 comprises a tubular body 26 having a major portion 26a of a uniform cross-section and an enlarged portion 26b of a greater diameter, and the absorbent 22 filled in the major portion 26a, the absorbent 22 being at least one selected from the group consisting of activated carbon, an ion exchange resin and silver-coated absorbent particles. The absorbent 2 is retained in the major portion 26a of the tubular body 26 by a pair of filter members 28 and 29 fitted in the opposite ends of the major portion 26a, respectively.

Preferably, the absorbent 22 contains activated carbon of which particle size is 8 to 40 mesh. The ion exchange resin may be either an anion exchange resin or a cation exchange resin and has a particle size of 20 to 50 mesh. The ion exchange resin either has a spherical shape or is amorphous. As the silver-coated absorbent particle, silver-coated activated carbon and other suitable silver-coated particles can be used. Such silver-coated absorbent particles are desirable because they effect not only the absorption but also the sterilization. The above absorbents of different kinds may be filled in the tubular body 26 either separately or in a mixed manner. The filter members 28 and 29 have a finer mesh than the particle size of the absorbent 22 and have, for example, 40 to 120 mesh and preferably 70 mesh. These filter members are made of metal or a resin having a certain degree of rigidity. Particularly, it is preferred that the filter member 29 interposed between the absorbent 22 and the connective member 24 should have a reinforcement of metal or a resin mounted around its periphery to ensure a sufficient cross-section of the path of flow of the water to be treated, thereby preventing the pressure drop.

As described above, the hollow-fiber filtering module 23 is of the type similar to the filtering module 10 of FIG. 1 but may be of the type similar to the filtering module 10a of FIG. 3.

When the hydrophilic hollow fibers are made of a microporous membrane temporarily hydrophilized by alcohol or the like, a water permeability of such a membrane is lowered if it is left under a dry condition for a long time. Therefore, in this case, it is preferred that the filtering module 23 is always filled with water. For this reason, the absorbent module 21 is disposed below the filtering module 23 with a check valve interposed between the two modules 21 and 23. The check valve is constituted by a valve element 31 and the connective member 24 serving as a valve body.

In this embodiment, the absorbent module 21 and the filtering module 23 are connected serially, that is, disposed coaxially with each other, and water to be treated is caused to flow from the absorbent module 21 to the filtering module 23. The lower end of a tubular shell 11 of the filtering module 23 is fitted in the enlarged portion 26b of the tubular body 26. An O-ring 32 is mounted around the lower end of the tubular shell 11 to positively retain the filtering module 23 relative to the absorbent module 21. The absorbent module 21 and the filtering module 23 may be coupled by a threaded connection or an adhesive. Also, the connection between the absorbent module 21 and the connective member 24 and the connection between the connective member 24 and the hollow-fiber filtering module 23 may be made separately. The connective member 24 is mounted within the enlarged portion 26b of the tubular body 26 and is interposed between the absorbent 22 and the filtering module 23.

Figure 5A:
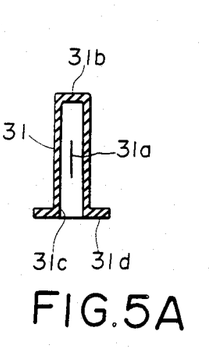
FIG. 5A is an enlarged cross-sectional view of a check valve element used in the unit of FIG. 5.

The connective member 24 has a flow passageway 34 extending therethrough at its center, and the water to be treated is caused to flow through the flow passageway 34. The check valve element 31 is mounted in the flow passageway 34 for preventing the water in the filtering module 23 from flowing back to the absorbent module 21. Thus, as described above, the connective member 24 and the check valve element 31 constitutes the check valve. In this embodiment, as best shown in FIG. 5A, the check valve element 31 comprises an elastic tube having a slit 31a formed through its peripheral wall, an upper end 31b of the elastic tube being closed while its lower end 31c is open. Other suitable types of check valves such as a ball-type check valve may be used. Since the check valve element 31 must be mounted in the flow passageway 34 of the connective member 24, the cross-section of the flow passageway 34 need to be small. If the filter member 29 is directly mounted on the lower end of the flow passageway 34 of a small cross-section, powdered absorbent particles flowing from the absorbent module 21 and foreign matters in the water to be filtered would finally cause a clogging of the filter member 29, so that the pressure required for the filtering operation is gradually increased. Finally, a hand-operated pressure pump can not achieve the filtering operation. The small cross-section of the flow passageway 34 aggravates the problem of the increased filtering pressure.

The flow passageway 34 has at its lower end a larger-diameter portion 34a on which a flange 31d of the check valve element 31 is seated. Thus, the larger-diameter portion 34a serves as a valve seat. The flow passageway 34 tapers downwardly toward the larger-diameter portion 34a. An enlarged bore 36 is formed in the lower end of the connective member 24 immediately adjacent to the larger-diameter portion 34a of the flow passageway 34 and is disposed in communication therewith. The enlarged bore 36 is at least two times larger than the inner diameter of the tubular check valve element 31 which is generally equal to the diameter of the smallest-diameter portion of the flow passageway 34 adjacent to the larger-diameter portion or valve seat 34a since the valve element 31 is made of a thin tube. Preferably, the diameter of the enlarged bore 36 is as large as possible. For example, it is more than five times larger than the inner diameter of the check valve element 31, and more preferably it is more than ten times. For example, when the inner diameter of the check valve element 31 is 2.3 mm, the enlarged bore 36 is 40 mm. The length of the enlarged bore 36 need to be at least 0.3 mm. If the enlarged bore 36 has a smaller length, the filter member 29, when flexed or bent by the filtering pressure, is brought into contact with the inner surface of the flow passageway 34, in which case there is no advantage of the provision of the enlarged bore 36. It is preferred that the length of the enlarged bore 36 is 0.3 to 10 mm.

A perforated plate 38 is mounted on the lower end of the tubular body 26 of the absorbent module 21 to retain the absorbent 22 in position. It is preferred that the filter member 28 is spaced from the perforated plate 38 by a distance of at least 0.3 mm to maintain a good filtering operation of the filter member 28. The perforated plate 38 may be omitted.

By virtue of the provision of the enlarged bore 36, the filtering efficiency of the filtering module 23 can be maintained at a required level without increasing the filtering pressure.

Figure 6:
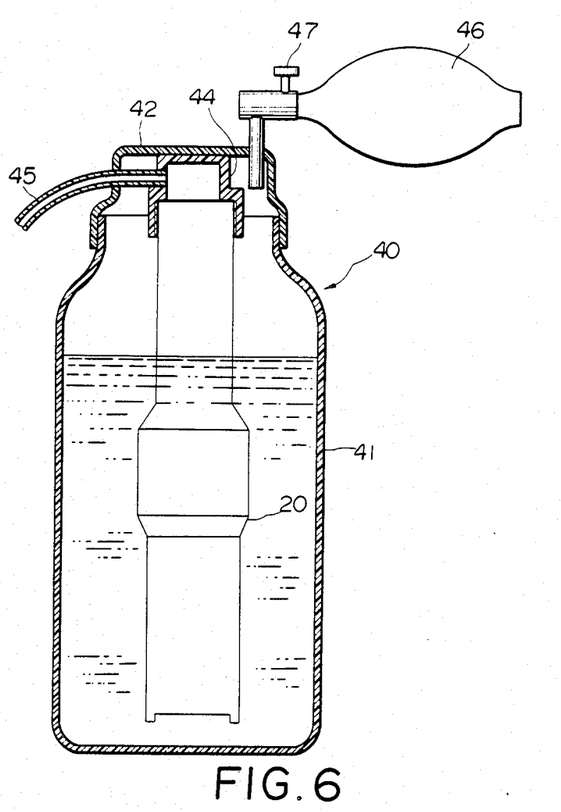
FIG. 6 is a cross-sectional view of a water purification device.

FIG. 6 shows a water purification device 40 incorporating the water purification unit 20 of FIG. 5. The water purification device 40 comprises a container 41 for holding water to be treated, a cap 42 fitted on an open end of the container 41. The water purification unit 20 is received in the container 41, and a header 44 is fitted on the upper end of the water purification unit 20. A nozzle 45 extends from the header 44 through the cap 42. A hand-operated pressure device 46 with a pressure-release means 47 is attached to the cap 42 for applying pressure to the interior of the container 41. When the pressure device 46 is operated, the water in the container 41 is caused to flow through the water purification unit 20 to be filtered by it and is discharged from the nozzle 45.

Figure 7:
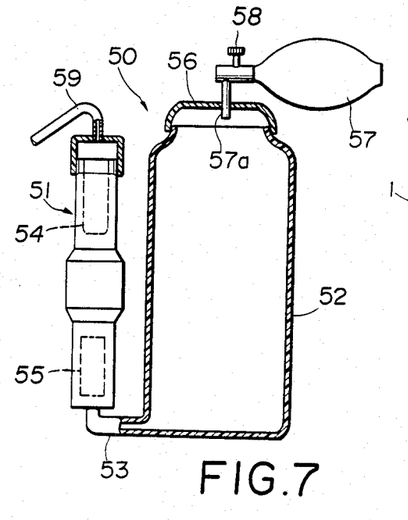
FIG. 7 is a cross-sectional view of a modified water purification device.

FIG. 7 shows another modified water purification device 50 which comprises a water purification unit 51 and a container 52 for holding water to be treated. The container 52 has a conduit 53 which extends laterally from a bottom thereof and is adapted to be removably connected to an inlet of the water purification unit 51 formed in a lower end thereof. The unit 51 containing a bundle 54 of microporous hollow fibers and an absorbent 55 such as activated carbon and an ion exchange resin. The bundle 54 is of the type similar to the hollow fiber bundle 12 of FIG. 1. The conduit 53 has a valve for shutting off the flow of the water therethrough. This valve may be of the type which is opened upon connection to the inlet of the water purification unit 51. The provision of the valve ensures that the water in the container 52 does not flow through the conduit 53 when the water purification unit 51 is detached from the container 52.

A lid 56 is detachably fitted on an edge of an upper opening of the container 52 in sealing relation thereto, and the lid 56 has an aperture in which a feed tube 57a of a hand-operated pressure device 57 is fitted in an air-tight manner. The pressure device 57 has a pressure-release means 58. Since the conduit 53 is provided at the bottom of the container 52, the water in the container 52 can be fully used. However, in the case where it is desired to use the water purification device 50 mainly for treating water containing sedimentatable foreign matters, such as water in a river, a pond and a swamp, it is preferred that the conduit 53 is spaced upwardly from the bottom of the container 52 by a distance of 5 mm to 2 cm to prevent the blocking of the conduit 53 by the sedimentatable matters.

A plurality of conduits may be provided at different levels, and one of the conduits is connected to the water purification unit 51 depending on the type of water to be treated.

Figure 8:
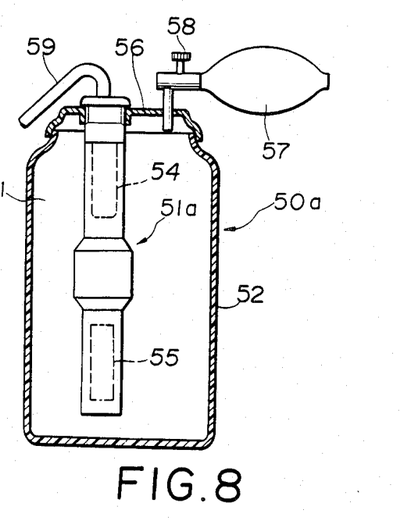
FIG. 8 is a view similar to FIG. 7 but showing a further modified water purification device.
Figure 9:
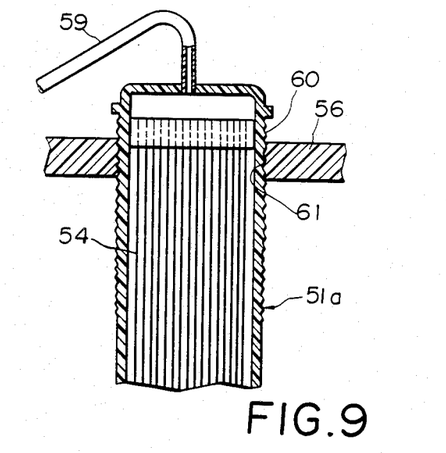
FIG. 9 is a fragmentary enlarged view of the device of FIG. 8.

FIG. 8 shows further modified water purification device 50a which differs from the water purification device 50 of FIG. 7 in that a water purification unit 51a is received in a container 52 with the conduit 53 being omitted. A lid 56 is detachably fitted on an edge of an upper opening of the container 52 and has an aperture in which the upper end of the water purification unit 51a is removably fitted in an air-tight manner. An annular member of an elastic material (not shown) such as rubber may be fitted in this aperture so that the upper end of the water purification unit 51a can be sealingly retained in position by the friction between the elastic annular member and the upper end of the unit 51a. With this construction, the spacing of the lower end of the water purification unit 51a from the bottom of the container 52 can be suitably varied. Alternatively, as shown in FIG. 9, an externally-threaded portion 60 is formed on the upper end of the water purification unit 51a, and an internally-threaded aperture 61 is formed in the lid 56. The externally-threaded portion 60 is screwed into the aperture 61 so that the lower end of the water purification unit 51a can be spaced from the bottom of the container 52 by a desired distance.

In the embodiment of FIG. 7, a pre-filter may be provided at the inlet of the conduit 53, and in the embodiment of FIG. 8 such a pre-filter may be provided at the inlet of the water purification unit formed at its lower end. Such a pre-filter serves to prevent foreign matters from intruding into the water purification unit. In the embodiment of FIG. 7, the pre-filter may take the form of a bag received in the container 52 and having generally the same size as the container 52, the bag being secured to the upper opening of the container 52 by the lid 56. In the embodiment of FIG. 8, the pre-filter may be in the form of a bag fitted on and secured to the lower end of the water purification unit 51a.

Referring to the operation of the water purification devices 50 and 50a of FIGS. 7 and 8, water to be treated is first introduced into the container 52 from its upper opening of a relatively large size, and the lid 56 is fitted in the upper opening of the container 52. Then, the pressure device 57 is operated to increase the pressure in the container 52 to a required level, so that the water to be treated is introduced into the water purification unit 51, 51a through its lower inlet. Then, the filtered water is discharged from a nozzle 59 connected to the upper end of the unit 51, 51a. The odor and taste-affecting substances of the water are removed by the absorbent 55 such as activated carbon and an ion exchange resin, and colloidal particles, bacilli and pyrogen in the water are removed by the bundle 54 of hollow fibers. In the case where the pre-filter is provided, foreign matters of a relatively large size in the water are caught by the pre-filter before it enters the water purification unit. One of the activated carbon and the ion exchange resin may be contained in the water purification unit while the other is contained in the container 52.

Figure 10:
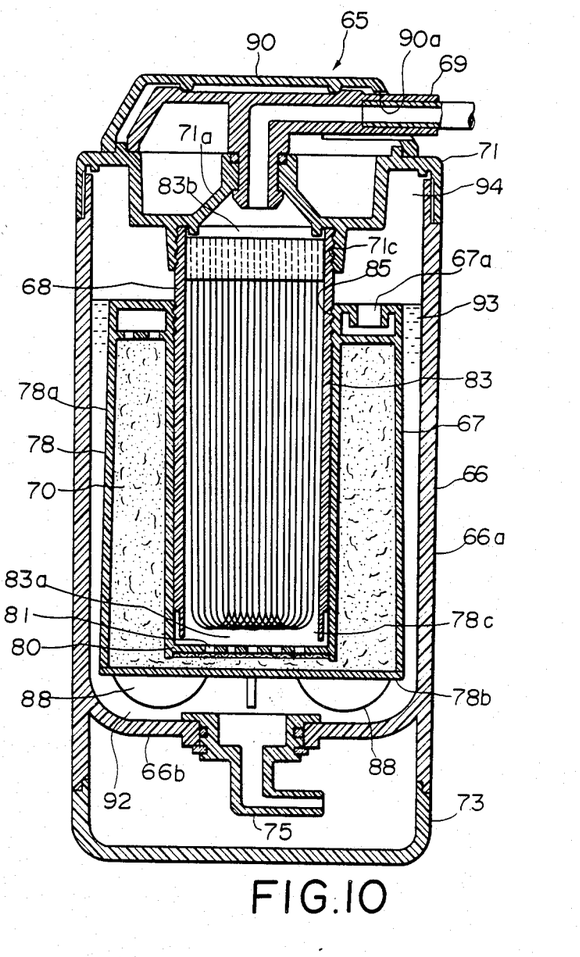
FIG. 10 is a cross-sectional view of a further modified water.

FIG. 10 shows a further modified water purification device 65 which comprises a container 66, an absorbent module 67 mounted in the container 66, a hollow-fiber filtering module 68 received in the container 66 and fitted in the absorbent module 67, and a nozzle 69 for discharging the treated water from the filtering module 68. The hollow-fiber filtering module 68 is of the type similar to the filtering module 10 of FIG. 1. The absorbent module 67 contains an absorbent 70 such as activated carbon. The container 66 comprises a tubular body 66a, and an upper cover member 71 removably fitted on the upper end of the container body 66a, and a bottom member 73 removably fitted on the lower end of the container body 66a. The absorbent module 67 and the filtering module 68 are removably mounted in the container 66 as later described so that they can be easily replaced by new ones when they become old and ineffective. The nozzle 69 is mounted for rotation about a vertical axis as later described.

The container body 66a has an opening at its bottom wall 66b, and a fitting 75 serving as an inlet of the container 66 is fitted in this opening in a liquid-tight manner. The upper cover member 71 has a central portion 71a of a generally inverted cup-shape which serves as an outlet of the container 66. The inlet or fitting 75 need to be provided at a level lower than an inlet 67a of the absorbent module 67. The container 66 is made of a material which can withstand a pressure of city water since a cock or faucet of city water is connected to the fitting 75 via a hose or the like.

The absorbent module 67 comprises a tubular body 78 containing the absorbent 70 and having an annular portion 78a and a bottom portion 78b, the annular portion 78a and the bottom portion 78b defining a central recess 78c of the circular shape. The inlet 67a is formed at the top of the annular portion 78a. An upper wall 80 of the bottom portion 78b is perforated as at 81, and these perforations serve as an outlet of the absorbent module 67. A tubular body 83 of the filtering module 68 is sealingly fitted in the central recess 78c. Preferably, the recess 78c is of such a size that at least a half of the filtering module body 83 is received in it. The absorbent 70 in the form of one or more of activated carbon, an ion exchange resin and a silver-coated activated carbon is filled in the absorbent module body 78. A sterilizing agent may also be added to the absorbent 70. The activated carbon 70 can be of any suitable type, and preferably its particle size is 8 to 40 mesh.

With this configuration of the absorbent module 67, the absorbent module and the filtering module 68 can be connected in a compact manner. In addition, the amount of filling of the absorbent 70 can be increased, and also the cross-section of the filled absorbent 70 can be increased, so that the activated carbon is subjected to a minimum pressure drop. For example, when the absorbent module body 78 has a volume of about 400 cc, the absorbent 70 can effectively treat city water of about 4 tons.

The filtering module body 83 is sealingly threaded into a threaded portion 85 formed in a surface of the recess 78c so that a lower open end or inlet 83a of the filtering module body 83 is disposed close to the outlet 81 in the form of the perforations. An upper open end or outlet 83b of the filtering module body 83 is sealingly threaded into a threaded inner surface 71c of the central portion 71a of the upper cover member 71. A pluralrty of finger pieces 88 are formed on the bottom of the absorbent module body 78 for facilitating the threaded connection between the filtering module body 83 and the central portion 71a of the upper cover member 71 and the threaded connection between the filtering module body 83 and the absorbent module body 78.

The nozzle 69 is connected to the central portion 71a of the upper cover member 71 for rotation or angular movement about an axis of the filtering module body 83. The nozzle 69 can be angularly moved through at least 60 degrees and preferably 180 degrees. A cap member 90 is mounted on the upper cover member 71 and has an opening 90a along which the nozzle 69 is moved when it is angularly moved.

The operation of the water purification device 65 will now be described. A cock or faucet of city water is connected to the fitting 75 via a rubber hose having a safety valve which is operated upon application of a predetermined pressure, for example, of 2 kg/cm$_2$. When the cock is opened, the city water is fed to the water purification device 65 through the fitting 75. When the device 65 is first used, the water is introduced into a bottom space 92 and annular space 93 of the container 66 and comes up to the level of the inlet 67a of the absorbent module 67. Then, the water is introduced into the absorbent module 67 through its inlet 67a. In this condition, air resides in a chamber 94 defined the upper portion of the container 66 above the inlet 67a and the upper cover member 71. When the water passes through the absorbent 70 in the annular portion 78a of the absorbent module body 78, impurities, odor-generating substances and chlorine ions as a sterilizing agent are removed by the absorption by the absorbent 70. Then, the water flows from the outlet 81 of the absorbent module into the hollow-fiber filtering module 68 in which those impurities and bacilli which have not been caught by the activated carbon 70 are rejected by the membrane. The purified water is discharged from the nozzle 69 through the outlet 83b of the filtering module 68 and the central portion 71a of the upper cover member 71.

Once the water is introduced into the water purification device 65, the non-treated water residing in the annular space 93 is separated from the chlorine-free water in the absorbent module 67 by the air in the chamber 94 when the supply of the water is stopped. With the conventional water purification devices, such non-treated water in the container is not separated from the water in the absorbent module when the supply of water is stopped. Therefore, the non-treated water in the container is in contact with the absorbent by diffusion so that the chlorine is removed from the water. As a result, such water does no longer possess a sterilizing effect. Therefore, once bacilli propagate in the absorbent unit, the conventional water purification device creates a source of propagation of the bacilli when the operation of the device is stopped.

With the water purification device 65 according to the present invention, the chlorine is contained in the water in the annular space 93, and therefore the absorbent module 67 is the only place where bacilli may propagate. As a result, the amount of transfer of the bacilli and the organic substances, decomposed by the bacilli absorbed in the absorbent 70, to the hollow-fiber filtering module 68 can be reduced, and the clogging of the hollow fibers of the filtering module can be delayed.

What is claimed is:

1. A water purification unit comprising a cartridge including:
   (a) a hollow-fiber filtering module comprising (i) a casing having an open end, (ii) a bundle of hollow fibers mounted within said casing, each of said hollow fibers having an open end, part of said hollow fibers being made of a microporous membrane having a portion of a hydrophobic nature, and the other hollow fibers being hydrophilic microporous membranes, and (iii) a fastening member sealingly joining said open ends of said hollow fibers to said open end of said casing in sealing relation thereto, said open ends of said hollow fibers opening to the exterior of said casing; and
   (b) an absorbent module comprising a tubular body containing a particulate absorbent and connected to said casing of said filtering module in coaxial relation thereto, said tubular body having an inlet at one end for introducing water to be treated thereinto and another end connected to said casing of said filtering module; and
   (c) a check valve having a valve body, fitted in said cartridge between said filtering module and said absorbent module, said valve body including a flow passageway communicating said absorbent module with said filtering module and having a smallest-diameter portion, and a valve element engageable with said smallest-diameter portion of said flow passageway and having means for preventing the water from flowing to said absorbent module from said filtering module, an enlarged bore being formed in an end of said valve body disposed adjacent to said absorbent module, and said enlarged bore being in communication with said flow passageway and being at least twice the diameter of said smallest-diameter portion of said flow passageway, and a filter member covering said enlarged bore on the side thereof adjacent said absorbent module.

2. A water purification unit according to claim 1, in which said hollow fibers having said hydrophobic portions are disposed at part of the periphery of said hollow fiber bundle.

3. A water purification unit according to claim 1, in which the ratio of the total of said hydrophobic portions to the total membrane area of said hollow fiber bundle is 0.2 to 10%.

4. The water purification device of claim 1 including a container having an opening for introducing water to be treated thereinto, said container comprising a lid for closing said opening in an air-tight manner, said lid comprising a pressure device for increasing a pressure in said container, and said pressure device having a pressure-release means, said cartridge containing filtering module, absorbent module and check valve being positioned in said container.

5. A water purification device comprising:
(a) a container having at its lower portion an inlet for a water to be treated and an outlet for the water at its upper portion;
(b) an absorbent module accommodated within said container and comprising a tubular body containing activated carbon, said absorbent module having an outlet and having an inlet which is disposed at a level higher than said inlet of said container and in communication therewith, said tubular body having a central recess; and
(c) a hollow-fiber filtering module comprising (i) a casing having an upper open end and an inlet in communication with said outlet of said absorbent module, (ii) a bundle of hollow fibers mounted within said casing, each of said hollow fibers having an open end, part of said hollow fibers being made of a microporous membrane having a portion of a hydrophobic nature, and the other hollow fibers being hydrophilic microporous membranes; and (iii) a fastening member sealingly joining said open ends of said hollow fibers to said open end of said casing in sealing relation thereto, said open ends of said hollow fibers opening to the exterior of said casing, said upper open end of said casing being sealingly connected to said outlet of said container, said casing of said filtering module being sealingly fitted in said central recess, wherein said absorbent module is spaced from said container to leave an annular space therebetween, said absorbent module inlet being positioned at a top thereof and above said activated carbon, a portion of said container above said absorbent module inlet being sealed and defining an air chamber, said air chamber and a top of said absorbent module separating water in said annular space from said activated carbon when a flow of water to be treated is stopped, whereby diffusion of chlorine from said water in said annular space into said activated carbon is prevented.

* * * * *